US012769651B2

(12) United States Patent
Harrison

(10) Patent No.: US 12,769,651 B2
(45) Date of Patent: Oct. 20, 2026

(54) DATA ERASURE SYSTEM FOR PERFORMING AN ERASURE OPERATION BY CONCURRENTLY OVERWRITING DATA ON TWO OR MORE BANKS OF MEMORY

(71) Applicant: BAE SYSTEMS PLC, London (GB)

(72) Inventor: Richard Harrison, Hereford and Worcester (GB)

(73) Assignee: BAE SYSTEMS PLC, London (GB)

( * ) Notice: Subject to any disclaimer, the term of this patent is extended or adjusted under 35 U.S.C. 154(b) by 3 days.

(21) Appl. No.: 18/992,478

(22) PCT Filed: Jun. 30, 2023

(86) PCT No.: PCT/GB2023/051720
§ 371 (c)(1),
(2) Date: Jan. 8, 2025

(87) PCT Pub. No.: WO2024/009064
PCT Pub. Date: Jan. 11, 2024

(65) Prior Publication Data
US 2026/0010469 A1 Jan. 8, 2026

(30) Foreign Application Priority Data
Jul. 8, 2022 (GB) ..................................... 2210082

(51) Int. Cl.
*G06F 12/02* (2006.01)
*H02J 9/06* (2006.01)

(52) U.S. Cl.
CPC .. *G06F 12/0246* (2013.01); *G06F 2212/7205* (2013.01); *H02J 9/06* (2013.01)

(58) Field of Classification Search
CPC ............. G06F 12/0246; G06F 11/1441; G06F 3/0653; G06F 3/0679; G06F 11/3058;
(Continued)

(56) References Cited

U.S. PATENT DOCUMENTS 9,830,257 B1 11/2017 Booth et al.
2004/0098416 A1* 5/2004 Moore ................ G06F 16/9017 707/E17.037
(Continued)

FOREIGN PATENT DOCUMENTS

EP 2555106 A2 2/2013
WO WO2006062511 A1 6/2006
WO WO2024009064 A1 1/2024

OTHER PUBLICATIONS

Combined Search and Examination Report received for GB Application No. 2210082.0, dated Nov. 4, 2022. 7 pages.
(Continued)

*Primary Examiner* — Yaima Rigol
*Assistant Examiner* — Edward Waddy, Jr.
(74) *Attorney, Agent, or Firm* — Arcane Law PLLC

(57) ABSTRACT

A data erasure system (100) comprising a memory (101) comprising a plurality of banks (101*a-n*). The data erasure system (100) further comprises a processor (102) configured to write data to and/or read data from one of the plurality of banks (101*a-n*) at a time. The data erasure system (100) further comprises an erasure module (106) configured to perform an erasure operation by overwriting data on two or more of the plurality of banks (101*a-n*) concurrently, wherein overwriting data on one of the two or 10 more banks (101*a-n*) is independent of overwriting data on another of the two or more banks (101*a-n*).

15 Claims, 4 Drawing Sheets

(58) Field of Classification Search
CPC .. G06F 3/0619; G06F 1/30; G06F 2212/7208; G06F 1/3203; G06F 11/0751
USPC .................................. 711/103, E12.008, 162
See application file for complete search history.

(56) References Cited

U.S. PATENT DOCUMENTS

| | | | | |
|---|---|---|---|---|
| 2004/0188710 | A1 | 9/2004 | Koren et al. | |
| 2005/0257017 | A1* | 11/2005 | Yagi | G06F 21/79 711/163 |
| 2009/0089482 | A1* | 4/2009 | Traister | G06F 12/0246 711/E12.001 |
| 2009/0172251 | A1 | 7/2009 | Norman | |
| 2011/0060868 | A1* | 3/2011 | Haukness | G06F 12/0246 711/E12.001 |
| 2012/0089766 | A1 | 4/2012 | Yu et al. | |
| 2014/0189213 | A1* | 7/2014 | Fujiki | G06F 12/0607 711/103 |
| 2015/0081986 | A1* | 3/2015 | Chin | G06F 12/0284 711/154 |
| 2016/0202749 | A1* | 7/2016 | Milton | G06F 11/1441 713/340 |
| 2017/0315889 | A1 | 11/2017 | Delaney et al. | |
| 2017/0371577 | A1 | 12/2017 | Liu et al. | |
| 2018/0254088 | A1 | 9/2018 | Date | |
| 2018/0275735 | A1 | 9/2018 | Katou | |
| 2021/0181983 | A1* | 6/2021 | Ki | G06F 3/0659 |
| 2022/0004343 | A1 | 1/2022 | Hara | |

OTHER PUBLICATIONS

International Search Report and Written Opinion received for PCT Application No. PCT/GB2023/051720. Mail date: Dec. 20, 2023. 19 pages.

* cited by examiner

DATA ERASURE SYSTEM FOR PERFORMING AN ERASURE OPERATION BY CONCURRENTLY OVERWRITING DATA ON TWO OR MORE BANKS OF MEMORY

The present disclosure relates to a system for erasing electronic data, and a backup power system for use with a system for erasing electronic data.

Electronic memory stores data digitally within memory cells, each of which stores a single bit of data (i.e. a binary digit whose value is either one or zero). A memory device may be volatile or non-volatile. A volatile memory device loses the data stored therein when power ceases to be supplied to the device, whereas a non-volatile memory device retains the data stored therein even when power is not supplied to the device.

It is often possible to recover data that has been deleted from a volatile or non-volatile memory device, which poses a risk to the security of data stored on such devices. To prevent recovery of unwanted data from a memory device, secure erasure techniques overwrite the unwanted data with patterns of bits such as all-ones, all-zeroes, a "checkerboard" (10101010/01010101), or a randomised sequence of ones and zeroes. Different patterns may be repeatedly written over all of the addresses in the memory containing the unwanted data in order to reduce the risk of the unwanted data being recovered. Such secure erasure techniques may be referred to simply as an erasure operation or as a sanitisation process.

Erasing memory by overwriting of patterns is typically performed by a processor accessing each location of the memory to overwrite the existing data. Erasing memory can be a time-consuming procedure, and memory may not always be erased properly. It is desirable to reduce the time taken for memory to be erased and to improve the resilience of systems for erasing memory.

SUMMARY

According to a first aspect of the invention there is provided a data erasure system. The data erasure system comprises a memory comprising a plurality of banks and a processor configured to write data to and/or read data from one of the plurality of banks at a time. The data erasure system further comprises an erasure module configured to perform an erasure operation by overwriting data on two or more of the plurality of banks concurrently, wherein overwriting data on one of the two or more banks is independent of overwriting data on another of the two or more banks.

By overwriting data on two or more banks concurrently, the erasure control module can complete the erasure operation more quickly than a processor that is capable of writing data to and/or reading data from only one bank at a time. Furthermore, by overwriting data on each bank independently, a delay in erasing one bank does not cause any delay in erasing other banks.

The memory may comprise a non-volatile memory device. For example, and without limitation, the non-volatile memory may comprise a flash memory device, a magnetic memory device (which may be a magnetic random-access memory (MRAM) device or a magnetic disk drive), a resistive random access memory (RRAM) device, or a ferroelectric random access memory (FeRAM) device.

The memory may comprise a volatile memory device. For example, and without limitation, the volatile memory may comprise a static random access memory (SRAM) device or dynamic random access memory (DRAM) device. The data erasure system can advantageously be used to quickly and securely erase data stored in a volatile memory device without interrupting the power supply to the device.

The memory may comprise any other suitable memory technology. Furthermore, the memory may comprise any suitable combination of non-volatile, volatile and/or semi-volatile memory devices.

It is envisaged that the erasure control module can be provided independently of the other components of the data erasure system. It is also envisaged that the data erasure system may be provided without the memory and/or processor, such that a user can couple their own memory and/or processor to the data erasure system.

Optionally, the data erasure system further comprises a plurality of dedicated buses, each dedicated bus corresponding to a respective one of the plurality of banks, and the erasure module is configured to overwrite data on each of the plurality of banks via the corresponding dedicated bus.

Optionally, the data erasure system further comprises a shared bus. The processor is configured to write data to and/or read data from one of the plurality of banks at a time via the shared bus.

Optionally, the data erasure system further comprises, for each of the plurality of banks, a switching circuit configured to electrically couple one of the processor or the erasure module to a respective bank.

Optionally, each switching circuit is configured to couple the processor to the respective bank via a shared bus, and each switching circuit is configured to couple the erasure module to the respective bank via a respective dedicated bus.

Optionally, each switching circuit comprises a pair of buffers, one of the pair of buffers operable to interface between the processor and the respective bank, and another of the pair of buffers operable to interface between the erasure module and the respective bank.

Optionally, the erasure module comprises control logic. The control logic may be configured to, during the erasure operation and for each of the plurality of banks: overwrite data at a first address; read data from the first address; determine whether the data has been correctly overwritten; upon determining that the data has not been correctly overwritten, re-overwrite the data at the first address; and/or upon determining that the data has been correctly overwritten, overwrite data at a second address.

In other words, the control logic verifies that data has been correctly overwritten at the first address before overwriting data at the second address. The second address may, or may not, be consecutive to the first address. The control logic may be configured to repeat the overwriting, reading and determining (and, if necessary, re-overwriting) until the data in all addresses in a bank have been correctly overwritten. The control logic is configured to perform these operations independently for each of the plurality of banks.

In an alternative implementation, the control logic may be configured to, during the erasure operation and for each of the plurality of banks: overwrite data at a plurality of addresses (and, in some examples, at all addresses); after overwriting data at the plurality of addresses, read data from a first address; determine whether the data has been correctly overwritten at the first address; upon determining that the data has not been correctly overwritten at the first address, re-overwrite data at the first address; and/or upon determining that the data has that the data has been correctly overwritten at the first address, read data from a second address and determine whether data has been overwritten at the second address. The control logic may be configured to repeat the reading and determining (and, if necessary, re-overwriting) until the data in all of the plurality of addresses have been correctly overwritten. The second address may, or may not, be consecutive to the first address. The control logic is configured to perform these operations independently for each of the plurality of banks.

In other words, in the alternative implementation, the control logic overwrites data at a plurality of addresses (and, in some examples, at all addresses) before verifying whether the data has been correctly overwritten. The alternative implementation may be beneficial for performing a "best effort" erasure procedure when there is insufficient power to guarantee that the previously-discussed implementation will overwrite data at all addresses.

Optionally, the erasure module comprises an application-specific integrated circuit or a field-programmable gate array.

Optionally, the erasure module is configured to write an overwrite pattern to each of the plurality of banks during the erasure operation.

The overwrite pattern may be a predetermined pattern of ones and zeroes or a randomised sequence of ones and zeroes.

Optionally, the data erasure system further comprises a backup power source configured to output a first voltage. The data erasure system may further comprise a step-up converter configured to receive the first voltage from the backup power source and to output a second voltage higher than the first voltage. The data erasure system may further comprise a capacitor bank comprising one capacitor or a plurality of capacitors connected in parallel, the capacitor bank configured to be charged by the output of the step-up converter, and wherein the capacitor bank is configured to supply power to the erasure module during the erasure operation.

Optionally, the data erasure system further comprises a power management circuit comprising control logic. The control logic may be configured to monitor the output of the backup power source; determine whether the output of the backup power source is below a predetermined threshold voltage indicative of the backup power source having sufficient electrical power to erase the plurality of banks during the erasure operation; and upon determining that the output of the backup power source is below the predetermined threshold, send a signal to the erasure module to cause the erasure module to perform the erasure operation.

According to a second aspect of the invention there is provided a backup power system for a data erasure system. The backup power system comprises a backup power source configured to output a first voltage; a step-up converter configured to receive the first voltage from the backup power source and to output a second voltage higher than the first voltage; and a capacitor bank comprising one capacitor or a plurality of capacitors connected in parallel, the capacitor bank configured to be charged by the output by the output of the step-up converter. The capacitor bank is configured to supply power to the data erasure system.

The backup power system may be used with any suitable data erasure system, and is not limited to the data erasure system disclosed herein.

Optionally, the backup power system further comprises an erasure module coupled to a memory, the backup power system further comprising a power management circuit comprising control logic. The control logic may be configured to: monitor the output of the backup power source; determine whether the output of the backup power source is below a predetermined threshold voltage indicative of the backup power source having sufficient electrical power to erase the memory; and upon determining that the output of the backup power source is below the predetermined threshold, cause the erasure module to initiate erasing of the memory.

The memory may comprise non-volatile memory. For example, and without limitation, the non-volatile memory may comprise a flash memory device, a magnetic memory device (which may be a magnetic random-access memory (MRAM) device or a magnetic disk drive), a resistive random access memory (RRAM) device, or a ferroelectric random access memory (FeRAM) device. The memory may comprise any other suitable memory technology.

The skilled person will appreciate that except where mutually exclusive, a feature described in relation to any one of the aspects, examples or embodiments described herein may be applied to any other aspect, example, embodiment or feature. Further, the description of any aspect, example or feature may form part of or the entirety of an embodiment of the invention as defined by the claims. Any of the examples described herein may be an example which embodies the invention defined by the claims and thus an embodiment of the invention.

BRIEF DESCRIPTION OF THE DRAWINGS

The invention will now be described, by way of example only, with reference to the accompanying drawings, in which.

DETAILED DESCRIPTION

Figure 1:
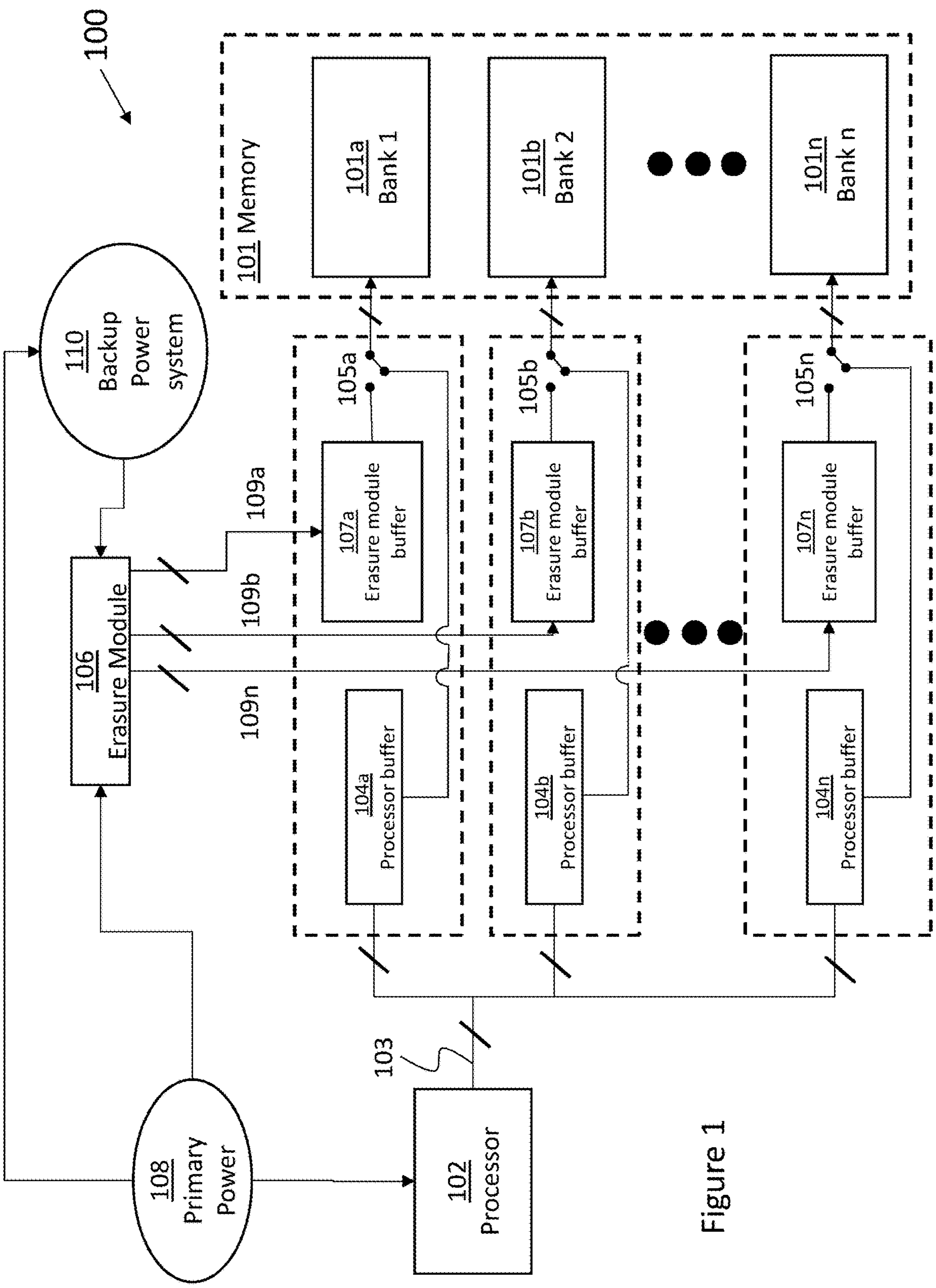
FIG. 1 is a schematic diagram of a data erasure system in a first state.

With reference to FIG. 1, a data erasure system 100 is provided for rapidly erasing memory 101. The memory 101 may be non-volatile memory (e.g. flash memory). Alternatively, the memory 101 may be volatile memory or semi-volatile memory. The memory 101 is divided into a number, "n", of banks 101*a*, 101*b*, 101*n*, where "n" is an integer greater than or equal to two. In general, each memory bank 101*a-n* comprises a discrete memory device that is capable of operating independently of the other banks 101*a-n*. Each discrete memory device may be a respective integrated circuit (IC) having its own input/output pins that can be connected to a bus (or multiple buses) to allow the bank 101*a-n* to communicate with another device (such as the processor 102 and erasure module 106 described below). As an example, the memory 101 may comprise eight flash memory devices, each having a capacity of eight megabytes (for a total of 64 megabytes).

The data erasure system 100 comprises a processor 102. The processor 102 may be a microprocessor or a microcontroller. Under normal operation, (i.e. when no erasure operation is being performed), the processor 102 reads data from and/or writes data to each of the memory banks 101*a-n* individually. That is to say, the processor 102 can access only one bank at a time. The processor 102 may be inherently limited to accessing only one memory bank at a time due to its particular hardware configuration (e.g., due to having a limited number of input/output pins and/or due to limitations in how it can address banks). The processor 102 may be connected to, and configured to communicate with, each of the banks 101*a-n* via a shared bus 103. Optionally, the data erasure system 100 comprises a first plurality of buffer circuits 104*a-n* (referred to herein as "processor buffers" for the sake of clarity), where each processor buffer 104*a-n* is interposed between the processor 102 and a respective bank 101*a-n*. As noted above, the banks 101*a-n* are individually read from, or written to, by the processor 102, with a single memory location in the memory 101 being accessed by the processor 102 at one time. The processor 102 may output chip-select signals via the shared bus 103 to select one or none of the banks 101*a-n* at any given time.

The data erasure system 100 further comprises an erasure module 106. The erasure module 106 is configured to perform an erasure operation on two or more (typically all) of the plurality of banks 101*a-n* concurrently and independently. The data erasure system 100 may comprise a plurality of dedicated buses 109*a-n*. The erasure module 106 may be connected to, and configured to communicate with, each of the banks 101*a*-101*n* via a respective dedicated buses 109*a-n*. Therefore, the erasure module 106 can independently control each bank 101*a-n*. This allows the erasure module 106 to concurrently read data from and/or write data to the banks 101*a-n*. Optionally, the data erasure system 100 comprises a second plurality of buffer circuits 107*a-n* (referred to herein as "erasure module buffers" for the sake of clarity), where each erasure module buffer 107*a-n* is interposed between the erasure module 106 and a respective bank 101*a-n*.

During an erasure operation, the erasure module 106 is typically configured to overwrite data on each of the banks 101*a-n* concurrently, thereby allowing data to be rapidly erased from the banks 101*a-n* of the memory 101. The data on the memory 101 is erased more quickly than if the processor 102 were to be used to perform the erasure operation because, as explained above, the processor 102 can access only one bank 101*a-n* at a time. The erasure module 106 advantageously reduces the time taken to perform an erasure operation by a factor of n (where "n" is the number of banks 101*a-n*), in comparison with using the processor 102 to perform the erasure operation. The erasure operation may involve overwriting data at each address in the memory 101 multiple times, and with different or the same overwrite pattern each time, in order to ensure that all data from the memory 101 has been irretrievably erased. Each of the dedicated buses 109*a-n* and the shared bus 103 are represented as single buses on FIG. 1 for ease of explanation, yet each may comprise separate control, address, and data buses for handling different types of input and output from the processor 102 and the erasure module 106.

In FIG. 1, the output for each bank 101*a-n* in FIG. 1 (via dedicated buses 109*a-n*) is shown as a single line for ease of explanation. However, the erasure module 106 may have multiple outputs for each bank 101*a-n*. The set of outputs for each bank 101*a-n* may comprise outputs for data transmission, control, and addressing. In an example, there are six outputs for each bank 101*a-n*. If there are eight banks 101*a-n* within the memory 101, then there are at least 48 outputs (provided by 48 input/output pins) on the erasure module 106. In examples, the erasure module 106 comprises an integrated circuit such as an application-specific integrated circuit (ASIC) or a field-programmable gate array (FPGA). An advantage of using an ASIC or an FPGA to implement the erasure module 106 is that an ASIC or FPGA can be chosen to have more input/output lines than a typical processor, thus allowing the erasure module 106 to communicate with each bank 101*a-n* independently and concurrently via a respective dedicated bus 109*a-n*. A further advantage of using an ASIC or an FPGA to implement the erasure module 106 is that ASICs and FPGAs generally consume less power than processors and, therefore, are more capable of completing the erasure operation when powered by a backup system with limited power (as described in more detail below). A further advantage of using an FPGA to implement the erasure module 106 is that the input and output pins of an FPGA can be easily configured provide a sufficient number of inputs and outputs for connecting the erasure module 106 to all of the banks 101*a-n* of the memory 101.

The banks 101*a-n* may be connected to the erasure module 106 and processor 102 via a Quad Serial peripheral Interface (QSPI) serial communication interface. Other suitable communication interfaces may be used.

In use, an erasure operation may be triggered by a user command. For example, a device (not shown) incorporating the data erasure system 100 described herein may comprise a "kill-switch" button directly linked to the erasure module 102 that initiates an erasure operation as soon as the button is activated. Alternatively or additionally, the erasure operation may be initiated via a software command executed by the processor 102. Upon executing the command, the processor 102 may issue a signal to the erasure module (e.g., via a communication path not shown in FIGS. 1 and 2) to the erasure module 106, where the signal causes the erasure module 106 to initiate the erasure operation. In examples, the device may be a computer comprising the processor 102 and in which the memory 101 stores sensitive data, and a user may initiate the erasure operation (either via the button or via software executed by the processor 102) when it is desired that the data be erased quickly and securely from the memory. As will be discussed below, an erasure operation may be initiated based on the amount of power that is available from a backup power system 110.

The data erasure system may comprise a plurality of pairs of buffers 104*a-n*, 107*a-n*, and a plurality of switches 105*a-n*. The switches 105*a-n* may each be switching circuits comprising one or more transistors (e.g. in a bridge configuration), but are shown as switches in FIG. 1 for ease of explanation. In FIG. 1, the switches are shown connecting the memory banks 101*a-n* to the processor 102 via a first one of the pairs of buffers 104*a-n*. In this first state, the processor 102 can read and/or write data to the banks 101*a-n*.

Figure 2:
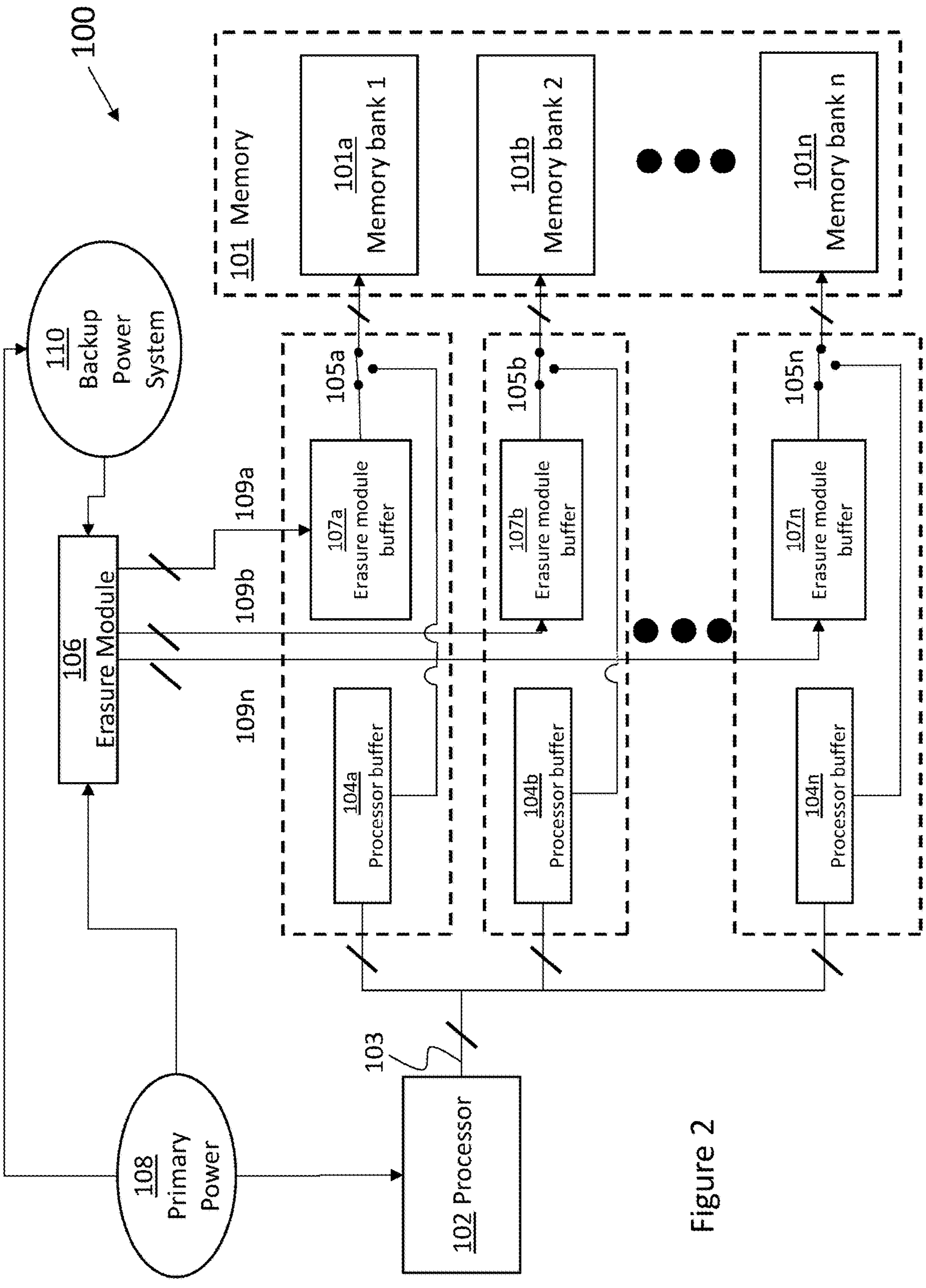
FIG. 2 is a schematic diagram of the data erasure system of FIG. 1 in a second state.

With reference to FIG. 2, the data erasure system of FIG. 1 is represented (with the same reference numerals) in a second state where the switches 105*a-n* are configured to connect the banks 101*a-n* to the erasure module 106. Each of the banks 101*a-n* is connected to the erasure module 106 via a respective second one of the pairs of buffers 104*a-n*. In the configuration of FIG. 2, the erasure module 106 can perform the erasure operation e.g. by addressing and overwriting data stored in the banks 101*a-n*, each bank 101*a-n* being processed independently of the others. The switches 105*a-n* may be configured to connect the banks 101*a-n* to the erasure module 106 in response to a voltage applied by the erasure module 106 to the switches 105*a-n* at the start of the erasure operation. In some examples, the buffers 104*a-n*, 107*a-n* are not required and the switches 105*a-n* are operable to switch direct connection of the banks between the shared bus 103 and the dedicated buses 109*a-n*.

Figure 3:
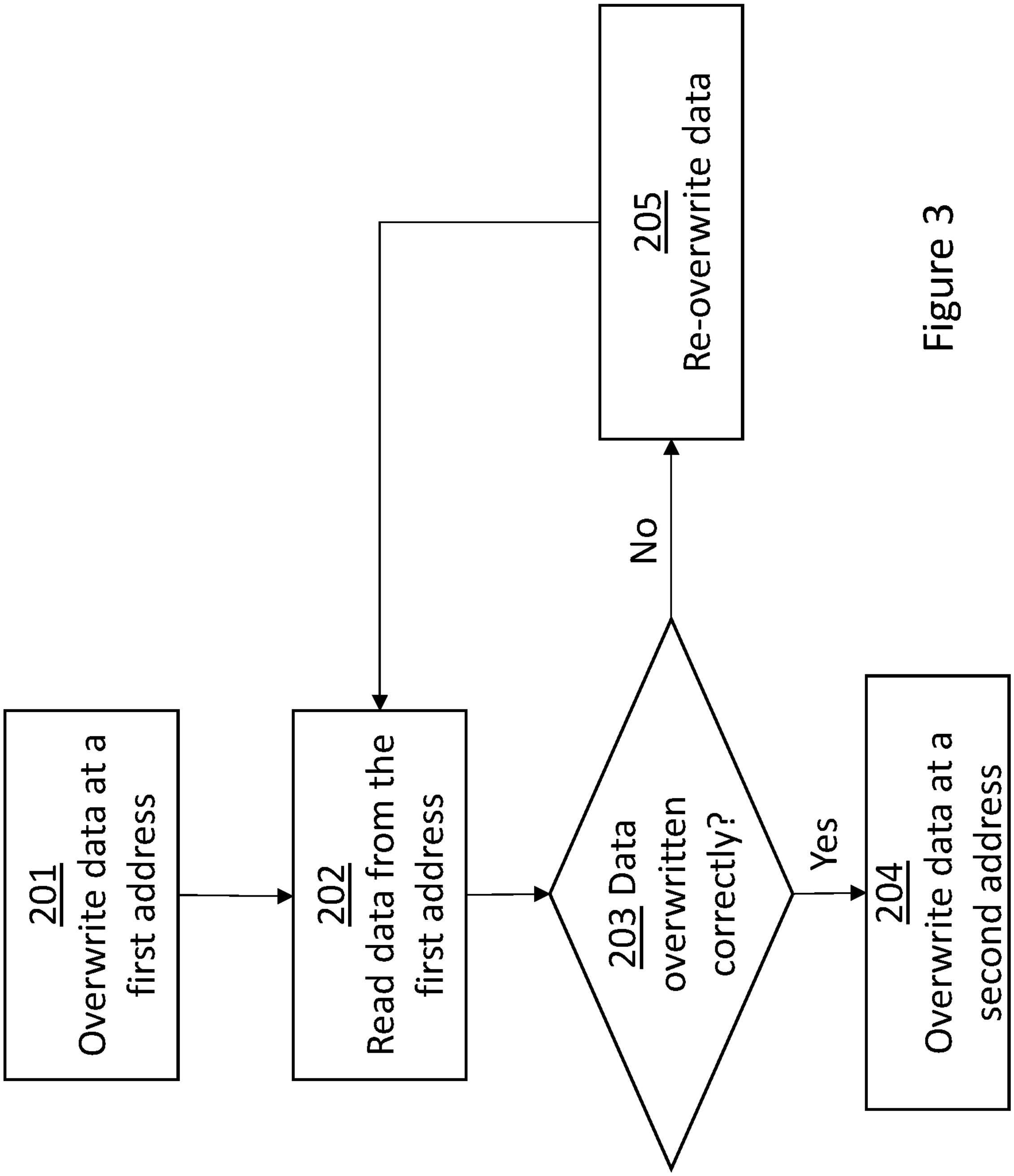
FIG. 3 is a process flow diagram of an erasure operation performed by the data erasure system of FIGS. 1 and 2.

The erasure module 106 may comprise control logic configured to perform the data erasure operation in a manner as illustrated in FIG. 3. For each of the plurality of banks 101*a-n*, at operation 201 the erasure module 106 may overwrite data at a first address. At operation 202, the erasure module 106 may read the state of the memory at the first address. At operation 203, the erasure module 106 determines whether the overwriting at the first address was successful based on the data read from the first address at operation 202. For example, the erasure module 106 may determine whether or not a desired overwriting pattern of ones and zeroes has been correctly recorded at the first address. If the original data at the first address has not been overwritten correctly, then the erasure module 106 re-overwrites the data at operation 202, and then rechecks the first address by repeating operations 202 and 203. When the erasure module 106 has determined that the data in the first address has been overwritten correctly, the erasure module 106 overwrites data at a second address in the bank at operation 204. The procedure continues until all addresses in a bank have been overwritten. As used herein, the term "overwrite" refers to writing over original data stored in the memory with a predetermined patterns of ones and/or zeroes. It may alternatively be considered that the erasure module is "writing" data over original data, the written data being such that the original data is difficult or impossible to retrieve. Advantageously, the erasure module 106 independently controls each bank 101*a-n*, and the erasing of each memory address is verified immediately post-overwriting. Therefore, any overwrite errors raised during a verification process occurring on one bank e.g. 101*a* do not delay the erasing of another bank e.g. 101*b*. In some cases, there may be a hardware problem with a particular bank preventing completion of the overwriting process of the bank. In this case, the remaining banks are erased without delay. Therefore, the speed of the erasure operation is rapid, particularly where there is an error in erasing data from some addresses in the memory 101.

Figure 4:
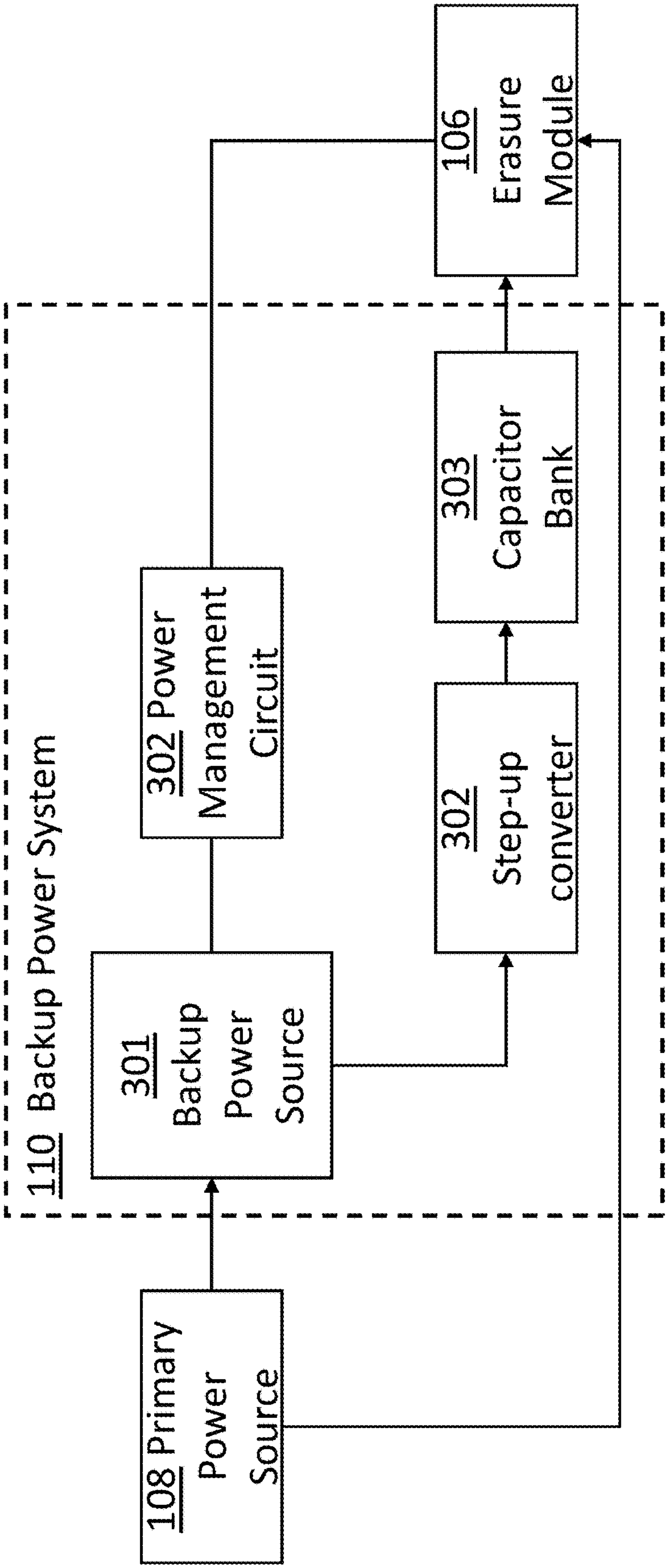
FIG. 4 is a diagram of a backup power system for use with the data erasure systems of FIGS. 1 and 2.

Returning to FIGS. 1 and 2, the data erasure system 100 may comprise a primary power source 108 for supplying power to the processor 102 and optionally to the erasure module 106. In normal use, the erasure module 106 is typically powered by the primary power source 108, e.g. mains power or a vehicle battery. The for data erasure system 100 may also comprise a backup power system 110 supplying power to the erasure module 106 in the event that the primary power source 108 is disrupted e.g. due to a mains power cut. Turning to FIG. 4, there is shown an example backup power system 110. The backup power system 110 comprises a backup power source 301, a step-up converter 302, and a capacitor bank 303 all connected in series with the erasure module 106. The backup power source 301 may be a battery and in examples is a 1.5V lithium "AA" sized rechargeable battery. The power source 301 may be charged from the primary power supply 108. The step-up converter 302 (e.g. a DC-DC converter) is configured to step-up the voltage output from the battery 301 and to output the resulting stepped-up voltage to the capacitor bank 303. The capacitor bank 303 may comprise a plurality of capacitors arranged in parallel, optionally with a total capacitance in the region of 100 to 1000 μF, e.g. 440 μF. The capacitor bank 303 is configured to be charged by the voltage output by the step-up converter 302. So long as the backup power source 301 is functioning, then the capacitor bank 303 is constantly being charged. In the event that an erasure operation must be performed and the primary power 108 is unavailable, then power stored in the capacitor bank 303 is supplied to the erasure module 106. The power stored in the capacitor bank 303 is sufficient to enable the erasure module 106 to complete the erasure operation to a reasonable standard e.g. when accounting for any errors in the memory 101 that may hinder the erasure operation.

The use of the step-up converter 302 and capacitor bank 303 allow the erasure module 106 to be provided with a sufficiently high amount of current that may not be obtainable directly from the backup power source 301. Therefore, the backup power source can be a compact and lightweight battery, such as a 1.5V lithium battery. The capacitor bank 303 may be able to deliver a current in the order of 100s of milliamps, whilst the backup power source 302 may only be able to deliver current in the order of microamps. Furthermore, the charge leakage rate over time of the capacitor bank 303 is low, and therefore the shelf life of the backup power system 110 is high. In the event of loss or disconnection of the primary power source 108, it remains possible to perform an erasure operation at a time in the distant future, e.g. in months or even years.

The backup power system 110 may also comprise a power management circuit 302. The power management circuit 302 is configured to monitor a voltage output of the backup power source 301. When the voltage output falls below a predetermined threshold indicative of the backup power source 301 having sufficient electrical power required to erase the plurality of banks during the erasure operation, the power management circuit is configured to send a signal to the erasure module 106 to initiate an erasure operation. The predetermined threshold may be a voltage that is known to be slightly higher, e.g. 0.1V greater, than a voltage level indicative of when the backup power source 301 has only just enough power remaining to complete an erasure operation. It is possible to determine the predetermined threshold by measuring the level of reduction of volts output by the battery caused by an erasure operation and adding a small contingency factor such as 0.1V. The security of data on the memory 101 is improved, since the power management circuit 302 causes data to be erased automatically before it becomes impossible to erase the data without connection to an external power source. For example, a device incorporating the data erasure system as disclosed herein may be disconnected from the primary source 108 whilst sensitive data is retained on the memory 101. If the device is lost or forgotten for some time after which the backup power source has reduced in charge, then there is a risk that the data cannot be removed by the data erasure system itself thus heightening the risk of the data being accessed by unauthorised users. The power management circuit 302 provides for the data to be erased automatically, thus mitigating this risk.

This disclosure also provides a backup power system 110 for a data erasure system comprising a backup power source configured to output current at a first voltage level; a step-up converter 302 configured to receive the current at the first voltage and to output current at a second voltage level higher than the first voltage level; and a capacitor bank 303 comprising one capacitor or a plurality of capacitors connected in parallel. The capacitor bank 303 is configured to be charged by the current output by the step-up converter 302. The capacitor bank is configured to output current to the data erasure system. The backup power system 110 may be provided in isolation and be compatible for use with a data erasure system 100 according to this disclosure or any other suitable data erasure system.

The backup power system may further comprise a power management circuit 302 comprising control logic configured to: monitor a voltage output of the backup power source 301 and determine when the voltage output falls below a predetermined threshold voltage indicative of when the backup power source 301 is holding sufficient electrical power to erase a plurality of memory banks 101*a-n*. When the voltage level is determined to fall below the predetermined level, the power management circuit is configured to initiate erasing of the plurality of memory banks 101*a-n*.

It will be understood that the invention is not limited to the examples and embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A data erasure system comprising:

a memory comprising a plurality of banks;

a shared bus;

a plurality of dedicated buses, each dedicated bus corresponding to a respective one of the plurality of banks;

a processor configured to write data to and/or read data from one of the plurality of banks at a time; and an erasure module configured to perform an erasure operation by overwriting data on two or more of the plurality of banks concurrently, wherein overwriting data on one of the two or more banks is independent of overwriting data on another of the two or more banks, a plurality of switching circuits comprising a switching circuit for each of the plurality of banks, each of the switching circuits configured to electrically couple one of the processor or the erasure module to a respective one of the banks, wherein each switching circuit is configured to couple the processor to the respective one of the banks via the shared bus, and wherein each switching circuit is configured to couple the erasure module to the respective one of the banks via a respective one of the dedicated buses.

2. The data erasure system according to claim 1, wherein the erasure module is configured to overwrite data on each of the plurality of banks via a corresponding one of the dedicated buses.

3. The data erasure system according to claim 1, wherein each switching circuit comprises a pair of buffers, one of the pair of buffers operable to interface between the processor and the respective one of the banks, and another of the pair of buffers operable to interface between the erasure module and the respective one of the banks.

4. The data erasure system according to claim 1, wherein the erasure module comprises control logic configured to, during the erasure operation and for each of the plurality of banks:

overwrite data at a first address;

after the overwriting, read data from the first address;

determine whether the data has been overwritten;

upon determining that the data has not been overwritten, re-overwrite the data at the first address; and/or upon determining that the data has been overwritten, overwrite data at a second address.

5. The data erasure system according to claim 1, wherein the erasure module comprises an application-specific integrated circuit or a field-programmable gate array.

6. The data erasure system according to claim 1, wherein the erasure module is configured to write an overwrite pattern to each of the plurality of banks during the erasure operation.

7. The data erasure system according to claim 1, further comprising:

a backup power source configured to output a first voltage;

a step-up converter configured to receive the first voltage from the backup power source and to output a second voltage higher than the first voltage; and a capacitor bank comprising one capacitor or a plurality of capacitors connected in parallel, the capacitor bank configured to be charged by the output of the step-up converter, and wherein the capacitor bank is configured to supply power to the erasure module during the erasure operation.

8. The data erasure system according to claim 7, further comprising a power management circuit comprising control logic configured to:

monitor the output of the backup power source;

determine whether the output of the backup power source is below a predetermined threshold voltage indicative of the backup power source having sufficient electrical power to erase the plurality of banks during the erasure operation; and upon determining that the output of the backup power source is below the predetermined threshold, send a signal to the erasure module to cause the erasure module to perform the erasure operation.

9. The data erasure system according to claim 2, wherein the processor is configured to write data to and/or read data from one of the plurality of banks at a time via the shared bus.

10. A backup power system for a data erasure system, the backup power system comprising:

a backup power source configured to output a first voltage;

a step-up converter configured to receive the first voltage from the backup power source and to output a second voltage higher than the first voltage; and a capacitor bank comprising one capacitor or a plurality of capacitors connected in parallel, the capacitor bank configured to be charged by the output of the step-up converter, and wherein the capacitor bank is configured to supply power to a data erasure system;

wherein the data erasure system comprises an erasure module coupled to a memory, the backup power system further comprising a power management circuit comprising control logic configured to:

monitor the output of the backup power source;

determine whether the output of the backup power source is below a predetermined threshold voltage indicative of the backup power source having sufficient electrical power to erase the memory; and upon determining that the output of the backup power source is below the predetermined threshold, cause the erasure module to initiate erasing of the memory.

11. The backup power system according to claim 10, the data erasure system comprising:

a memory comprising a plurality of banks;

a processor configured to write data to and/or read data from one of the plurality of banks at a time; and an erasure module configured to perform an erasure operation by overwriting data on two or more of the plurality of banks concurrently, wherein overwriting data on one of the two or more banks is independent of overwriting data on another of the two or more banks.

12. The backup power system according to claim 11, the data erasure system further comprising a plurality of dedicated buses, each dedicated bus corresponding to a respective one of the plurality of banks, and wherein the erasure module is configured to overwrite data on each of the plurality of banks via the corresponding dedicated bus.

13. The backup power system according to claim 11, the data erasure system further comprising a shared bus, wherein the processor is configured to write data to and/or read data from one of the plurality of banks at a time via the shared bus.

14. The backup power system according to claim 11, the data erasure system further comprising, for each of the plurality of banks, a switching circuit configured to electrically couple one of the processor or the erasure module to a respective one of the banks.

15. The backup power system according to claim 11, the data erasure system further comprising, for each of the plurality of banks, a switching circuit, wherein each switching circuit is configured to couple the processor to a respective one of the banks via a shared bus, and wherein each switching circuit is configured to couple the erasure module to the respective one of the banks via a respective dedicated bus.

* * * * *